Oct. 24, 1961
D. W. BREDE
3,005,582
TAPE RECORDING AND REPRODUCING APPARATUS
AND DRIVE SYSTEM THEREFOR
Filed Aug. 13, 1959
2 Sheets-Sheet 1

*INVENTOR.*
DWIGHT W. BREDE
*BY*
Flehr & Swain
ATTORNEYS

Oct. 24, 1961 D. W. BREDE 3,005,582

TAPE RECORDING AND REPRODUCING APPARATUS AND DRIVE SYSTEM THEREFOR

Filed Aug. 13, 1959 2 Sheets-Sheet 2

INVENTOR.
DWIGHT W. BREDE

BY Flehr & Swain

ATTORNEYS 3,005,582

TAPE RECORDING AND REPRODUCING APPARATUS AND DRIVE SYSTEM THEREFOR

Dwight W. Brede, Mountain View, Calif., assignor to Ampex Corporation, Redwood City, Calif., a corporation of California Filed Aug. 13, 1959, Ser. No. 833,452
4 Claims. (Cl. 226—35)

This invention relates generally to a recording and/or reproducing apparatus employing a pliable tape-like recording medium, for example, magnetic tape apparatus.

In recording and/or reproducing apparatus employing a tape-like medium, for example, a magnetic tape recorder, the recording medium is driven at a substantially constant velocity by a cylindrical drive means, in turn driven by a constant speed motor. In general, the capstan includes a heavy flywheel to minimize any speed changes. Pressure between the tape and capstan is usually maintained by a capstan idler which is adapted to releasably clamp the tape against the capstan. For fast forward and rewind modes of operation, the idler is moved away from the capstan whereby the tape may move freely past the capstan. The idler may be carried, for example, on a spring loaded, solenoid operated arm and electrically actuated to engage and release the magnetic tape.

It is desirable that in many types of application where the tape reels are relatively bulky and where compliance means may not be provided, that the linear velocity of the tape be near the peripheral velocity of the capstan when the idler is clamped against the tape. Otherwise, the tension of the tape will increase on one side and decrease on the other. In some instances, the forces may be sufficient to cause tape breakage. In many types of prior apparatus, a compliance arm or other suitable means are provided to maintain a substantially constant tension whereby the tape is not subjected to extreme forces. In other apparatus, vacuum chambers serve to supply the tape under low pressure and to take up the tape whereby the foregoing effects are not objectionable since the vacuum chamber takes up any sudden changes in velocity.

It is a general object of the present invention to provide a recording and/or reproducing apparatus which incorporates means for synchronizing the peripheral velocity of the recording medium and of the capstan drive.

It is another object of the present invention to provide a recording and/or reproducing system which does not employ vacuum chambers or compliance arms.

It is a further object of the present invention to provide a magnetic tape apparatus which includes means for inhibiting motion of the capstan idler until the speed of the tape is the same as the speed of the capstan surface.

These and other objects of the invention will become more clearly apparent from the following description when taken in conjunction with the accompanying drawing.

Referring to the drawing.

Figure 1:
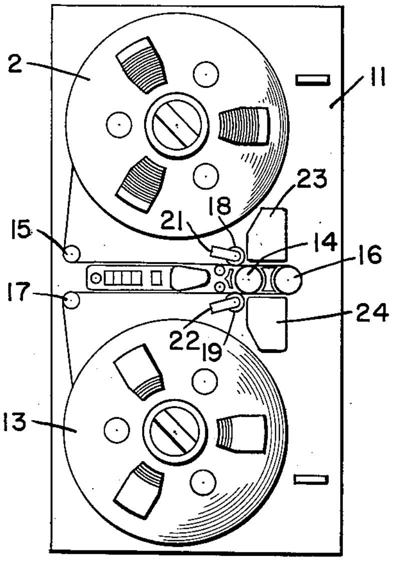
FIGURE 1 is a plan view of the mechanical portions of a machine incorporating the present invention.

In FIGURE 1, there is illustrated a magnetic tape transport of the closed loop type. The transport includes a framework 11 which carries supply and take-up reels 12 and 13. Suitable turntables are provided for receiving the reels and suitable drive means, for example, drive motors are associated with each of the turntables. Such reel drive means are well known in the art and are not illustrated.

In general, the turntables include braking means to decelerate the reels upon change of mode of operation. Suitable tension in the tape may be obtained by energizing one of the motors in a reverse direction, or by applying a braking action, or both.

On leaving the supply reel 12, the tape passes over the idler 15, the capstan drum 14, the turn-around idler 16, and again passes over the capstan drum 14, and then over the idler 17, and thence onto the take-up reel 13. The capstan idlers 18 and 19 are carried on the capstan idler arms 21 and 22, respectively.

Magnetic heads (not shown) are carried in the housings 23 and 24 and adapted to engage that portion of the loop extending between the capstan 14 and the turn-around idler 16.

Figure 2:
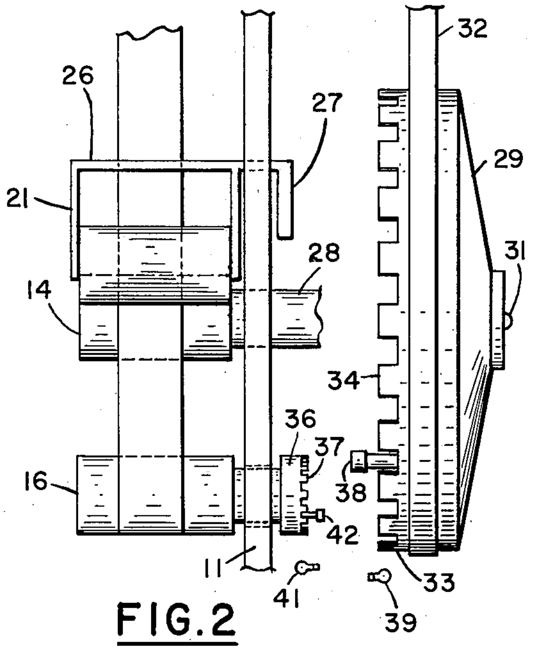
FIGURE 2 is a side elevational view of the capstan and turn-around idler assembly in accordance with the invention.

As described above, it is important that the capstan idlers 18 and 19, or pinch rollers, only engage the tape when the velocity of the tape passing over the capstan drum 14 has a velocity substantially equal to the peripheral velocity of the capstan drive drum. Referring to FIGURE 2, a side elevational view showing the idler arm 21, the capstan 14, and turn-around idler 16 is shown. The arm 21 may, for example, be mounted on a shaft 26 which extends down to the tape plate and is engaged by a crank arm 27 which is suitably actuated to move the capstan idler into engagement with the magnetic tape. The capstan 14 cylinder is mounted on a capstan shaft 28 which extends through the frame 11, and engages a flywheel 29 being suitably secured thereto, as for example, by a screw 31. A synchronous motor, not shown, serves to drive the flywheel through a belt 32. In accordance with the present invention, the flywheel 29 includes a rim 33 which is notched with a plurality of equally spaced notches 34.

Similarly, the idler 16 is carried on the frame 11. The portion extending beneath the frame 11 is provided with a rim 36 which is notched to provide a plurality of equally spaced notches 37.

In accordance with the present invention, a photoelectric cell 38 is placed within the rim 33 and a light source 39 is placed outside of the rim whereby light impinges upon the photoelectric transducer 38 periodically to provide a substantially squarewave output pulse having a frequency which is dependent upon the number of notches 34 and the velocity of the capstan flywheel 29. Thus, the output frequency of the squarewave will be directly related to the peripheral velocity of the capstan 14.

Similarly, a light source 41 is placed outside of the rim 36 and a photoelectric cell 42 is placed within the rim. Here again, the output of the photoelectric transducer 42 will be a squarewave having a velocity directly related to the velocity of the idler 16.

By providing a like number of notches on the rims 33 and 36, and equal diameter for the idler 16 and capstan 14 the output frequency from the photoelectric cells 38 and 42 is identical when the peripheral velocities of the idler 16 and capstan 14 are identical. However, it is to be observed that if the wheels have different diameters, this fact may be compensated by providing the proper ratio of the number of notches formed in each of the rims or by providing a proper ratio in the comparison circuit which will be explained hereinafter.

Figure 3:
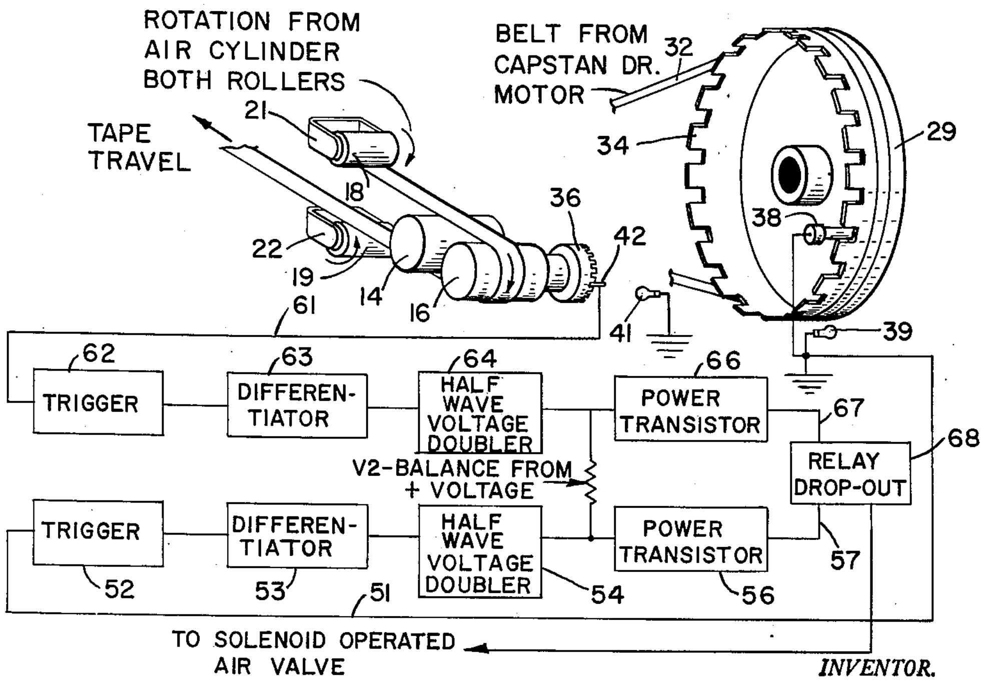
FIGURE 3 is a schematic diagram, partly in perspective, showing the means for assuring synchronization of the synchronizing means in accordance with the invention.

Referring to FIGURE 3, a schematic diagram illustrating the frequency generators in perspective is shown. Like parts carry like reference numerals to those in FIGURE 2. The output of the photocell 38 is applied along the line 51 to a trigger circuit 52 which circuit may, for example, be a multivibrator whose frequency is controlled by the frequency along the line 51. The output of the trigger 52 is differentiated at differentiator 53 and applied to a half-wave voltage doubler 54 whereby an output of one polarity is applied to the power transistor 56 which provides a D.-C. current of one polarity along the line 57.

Similarly, the output of the photocell 42 is applied along the line 61 to a trigger circuit which may be a controlled multivibrator. The output of the multivibrator is differentiated at differentiator 63 and applied to a half-wave voltage doubler 64, and, thence, to a power transistor 66 which serves to provide an output signal along the line 67 of a polarity the same as that on the line 57.

Individual pulses from the photoelectric cells 38 and 42 are applied to determine the frequency of the trigger circuits 52 and 62. After differentiation each cycle of the trigger output will be represented by pulses with substantially equal amplitude and duration regardless of the difference in input frequency. This differentiated output is then applied to the half-wave voltage doubler which rectifies the differentiated outputs and provides a voltage multiplication. At this point for each cycle of frequency from either of the photocells 38 or 42, a single voltage excursion of uniform amplitude and duration appears at the output of the half-wave voltage doubler 54 and 64, respectively. This output is respectively applied to the power transistors 56 and 66 and thence to opposite sides of the relay 68. Upon an unbalance of the voltages applied in the lines 57 and 67 to the relay 68, the relay will maintain the capstan idler separated from the capstan. Upon a balance of the voltages in the lines 57 and 67, the relay 68 will permit the capstan idler to engage the capstan and consequently drive the tape.

It will be observed that the voltages on the lines 57 and 67 will have a value which is dependent upon the frequency of the multivibrators 52 and 62. When the voltages are equal, there will be zero actuating voltage on the control relay 68 which serves to control the capstan idler drive means. When the relay is deactuated, it serves to permit the power to be applied to the capstan idler clamping means which is clamped against the tape to provide a tape drive.

A circuit fulfilling the requirements mentioned above was constructed and operated. The schematic of the circuit appears in FIGURE 4 of the drawing and the component values are as follows:

| | |
|---|---|
| Voltages: | |
| V1 | +26VDC |
| V2 | +27VDC |
| Photocells: | |
| **81** | CL904S |
| **83** | CL904S |
| Transistors: | |
| **85** | 2N525 |
| **87** | 2N525 |
| **89** | 2N525 |
| **91** | 2N525 |
| **93** | 2N301 |
| **95** | 2N301 |
| Diodes: | |
| **97** | 1N91 |
| **99** | 1N91 |
| **101** | 1N91 |
| **103** | 1N91 |
| **105** | 1N92 |
| **107** | 1N92 |
| Resistors: | Ohms |
| **111** | 10K |
| **113** | 3300 |
| **115** | 68K |
| **117** | 3300 |
| **119** | 12K |
| **121** | 2200 |
| **123** | 100 |
| **125** | 1000 |
| **127** | 1000 |
| **129** | 100 |
| **131** | 560 |
| **133** | 1500 |
| **135** | 1500 |
| **137** | 10K |
| **139** | 68K |
| **141** | 3300 |
| **143** | 2200 |
| **145** | 12K |
| **147** | 3300 |
| **149** | 100 |
| **151** | 1000 |
| **153** | 1000 |
| **155** | 560 |
| **157** | 100 |
| **159** | 100 |
| Capacitors: | microfarads |
| **161** | 4 |
| **163** | 1.0 |
| **165** | 100 |
| **167** | 4 |
| **169** | 1.0 |
| **171** | 100 |
| **173** | 50 |
| **175** | 50 |

Figure 4:
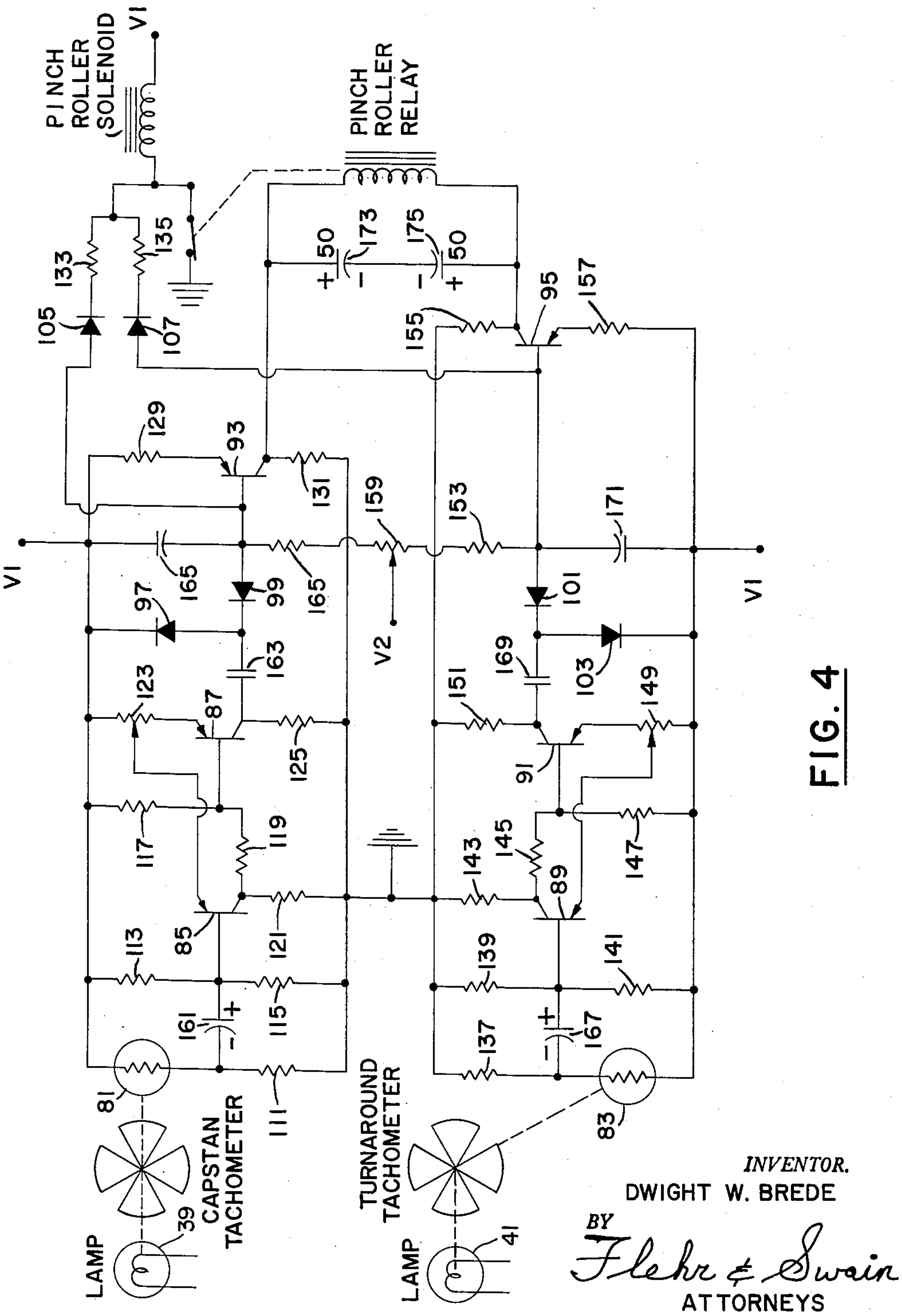
FIGURE 4 is a view schematically showing the means for deriving signals which are dependent upon the velocity of the capstan and of the tape.

In the circuit shown in FIGURE 4 the elements 81 and 83 correspond to the photocells 38 and 42, respectively, as shown in FIGURE 3. The trigger circuit 52 of FIGURE 3 is shown in FIGURE 4 as a modified Schmitt trigger circuit including the transistors 85 and 87. Likewise the trigger circuit 62 corresponds to the circuit including transistors 89 and 91. Capacitors 163 and 169 serve the function of the differentiators 53 and 63. The voltage doubler 54 of FIGURE 3 corresponds to the circuit including the diode 97 and 99 in FIGURE 4. Likewise the voltage doubler 64 corresponds to the circuit of the diodes 101 and 103. The power transistors 56 and 66 shown in FIGURE 3 correspond to the transistors 93 and 95 respectively in FIGURE 4 and the relay 68 of FIGURE 3 is denoted as the pinch roller relay in FIGURE 4.

I claim:

1. In a tape apparatus of the type which includes a capstan drive and movable pinch roller, means forming a signal dependent upon the speed of the tape, means for developing a signal dependent upon the speed of the capstan surface, and means responsive to said signals serving to inhibit operation of the movable pinch roller until the signals indicate that the tape and capstan are travelling at the same velocity.

2. In a magnetic tape apparatus of the type which includes a capstan drive and movable pinch roller, means forming a signal whose frequency is dependent upon the speed of the tape, means for forming a signal whose frequency is dependent upon the speed of the capstan surface, means associated with each of said signal generating means for forming an output signal having an amplitude corresponding to the frequency of the same, means responsive to said output signals and serving to inhibit operation of the movable pinch roller until the signals are equal in amplitude.

3. A tape transport system of the type employing a capstan drive and a movable pinch roller, means for generating a signal frequency dependent upon the velocity of the tape, means for generating a signal frequency dependent upon the peripheral velocity of the capstan, and comparison means for comparing said signals to determine the relative velocity of said tape with said capstan and means responsive to said comparison means to inhibit operation of said pinch roller until said velocities are equal.

4. The system as defined in claim 3 wherein said signal generating means include a photoelectric cell.

References Cited in the file of this patent

UNITED STATES PATENTS

| | | |
|---|---|---|
| 2,604,321 | Williams | July 22, 1952 |
| 2,877,012 | Angel et al. | Mar. 10, 1959 |